United States Patent [19]

Carmichael et al.

[11] Patent Number: 5,894,560
[45] Date of Patent: Apr. 13, 1999

[54] METHOD AND APPARATUS FOR CONTROLLING I/O CHANNELS RESPONSIVE TO AN AVAILABILITY OF A PLURALITY OF I/O DEVICES TO TRANSFER DATA

[75] Inventors: Richard D. Carmichael, Longmont; Joel M. Ward; Michael A. Winchell, both of Fort Collins, all of Colo.

[73] Assignee: LSI Logic Corporation, Milpitas, Calif.

[21] Appl. No.: 08/702,998

[22] Filed: Aug. 26, 1996

Related U.S. Application Data

[63] Continuation of application No. 08/407,439, Mar. 17, 1995, abandoned.

[51] Int. Cl.$^6$ .................................................. G06F 13/00
[52] U.S. Cl. .......................... 395/845; 395/827; 395/840
[58] Field of Search .................................. 395/825, 826, 395/827, 840, 841, 844, 845, 800, 600

[56] References Cited

U.S. PATENT DOCUMENTS

| | | | |
|---|---|---|---|
| 4,371,932 | 2/1983 | Dinwiddie, Jr. et al. | 364/200 |
| 4,782,439 | 11/1988 | Borkar et al. | 395/800 |
| 4,805,137 | 2/1989 | Grant et al. | 364/900 |
| 4,807,121 | 2/1989 | Halford | 364/200 |
| 4,821,170 | 4/1989 | Bernick et al. | 395/856 |
| 4,831,523 | 5/1989 | Lewis et al. | 364/200 |
| 5,016,160 | 5/1991 | Lambeth et al. | 395/844 |
| 5,031,097 | 7/1991 | Katakami et al. | 395/848 |
| 5,131,081 | 7/1992 | MacKenna et al. | 395/275 |
| 5,179,709 | 1/1993 | Bailey et al. | 395/725 |
| 5,185,876 | 2/1993 | Nguyen et al. | 395/425 |
| 5,206,933 | 4/1993 | Farrell et al. | 395/200 |
| 5,212,795 | 5/1993 | Hendry | 395/725 |
| 5,251,303 | 10/1993 | Fogg, Jr. et al. | 395/275 |
| 5,251,312 | 10/1993 | Sodos | 395/425 |
| 5,301,279 | 4/1994 | Riley et al. | 395/275 |
| 5,305,319 | 4/1994 | Sowell | 370/85.13 |
| 5,355,476 | 10/1994 | Fukumura | 395/600 |
| 5,367,639 | 11/1994 | Sodos | 395/275 |
| 5,386,532 | 1/1995 | Sodos | 395/425 |

(List continued on next page.)

FOREIGN PATENT DOCUMENTS

| | | | |
|---|---|---|---|
| 0317481 | 5/1989 | European Pat. Off. | G06F 15/16 |
| 0530543 | 3/1993 | European Pat. Off. | G06F 13/32 |
| 0537401 | 4/1993 | European Pat. Off. | G06F 15/16 |
| 0549924 | 7/1993 | European Pat. Off. | G06F 13/28 |
| 9306553 | 4/1993 | WIPO | G06F 13/28 |

OTHER PUBLICATIONS

IBM Technical Disclosure Bulletin, Jan., 1994; DMA Controller Channel Interlocking; vol. 37, No. 1; pp. 337–342.
IBM Technical Disclosure Bulletin, Feb., 1995; Priority Scheme for Arithemetic Logic Unit and Dataflow Usage by P1394 Isochronous Hardware; vol. 38, No. 2; pp. 477–480.
Programming Interface for Bus Master IDE Controller Revision 0.9; Jun. 14, 1994; Brad Hosler; Intel Corporation; pp. 1–6.

Primary Examiner—Christopher B. Shin
Attorney, Agent, or Firm—David K. Lucente

[57] ABSTRACT

An apparatus and method for improving the input/output performance of a computer system under the control of a multi-tasking, multi-threaded operating system. In particular, the invention provides an apparatus and method to chain contiguous DMA scatter gather sub blocks of a PRD table for channel 0 with contiguous DMA scatter gather sub blocks of a PRD table for channel 1, using a single data manager, while maintaining maximum media bandwidth. DMA block transfers are scheduled based on the availability of data from the I/O device's buffer memory, thus minimizing both media or network idle time as well as minimizing I/O bus idle time. Near maximum aggregate bandwidth of multiple I/O buses and their associated devices is obtained. The apparatus and method thus provides significant performance advantages over prior techniques having two I/O channel systems implemented with a single data manager.

7 Claims, 15 Drawing Sheets

U.S. PATENT DOCUMENTS

| | | | |
|---|---|---|---|
| 5,388,219 | 2/1995 | Chan et al. | 395/275 |
| 5,388,237 | 2/1995 | Sodos | 395/425 |
| 5,404,454 | 4/1995 | Parks | 395/275 |
| 5,418,909 | 5/1995 | Jackowski et al. | 395/275 |
| 5,438,665 | 8/1995 | Taniai et al. | 395/845 |
| 5,551,006 | 8/1996 | Kulkarni | 711/146 |
| 5,574,944 | 11/1996 | Stager | 395/825 |
| 5,613,162 | 3/1997 | Kabenjian | 395/842 |
| 5,655,151 | 8/1997 | Bowes et al. | 395/842 |
| 5,671,439 | 9/1997 | Klein et al. | 395/821 |
| 5,687,392 | 11/1997 | Radko | 395/842 |
| 5,701,516 | 12/1997 | Cheng et al. | 395/842 |
| 5,740,466 | 4/1998 | Goldman et al. | 395/825 |

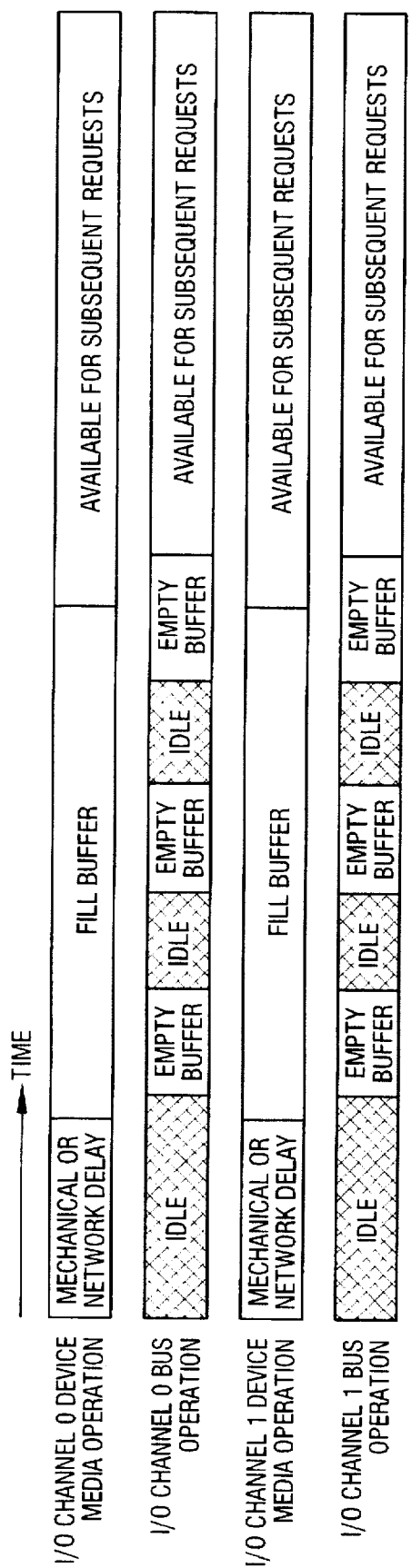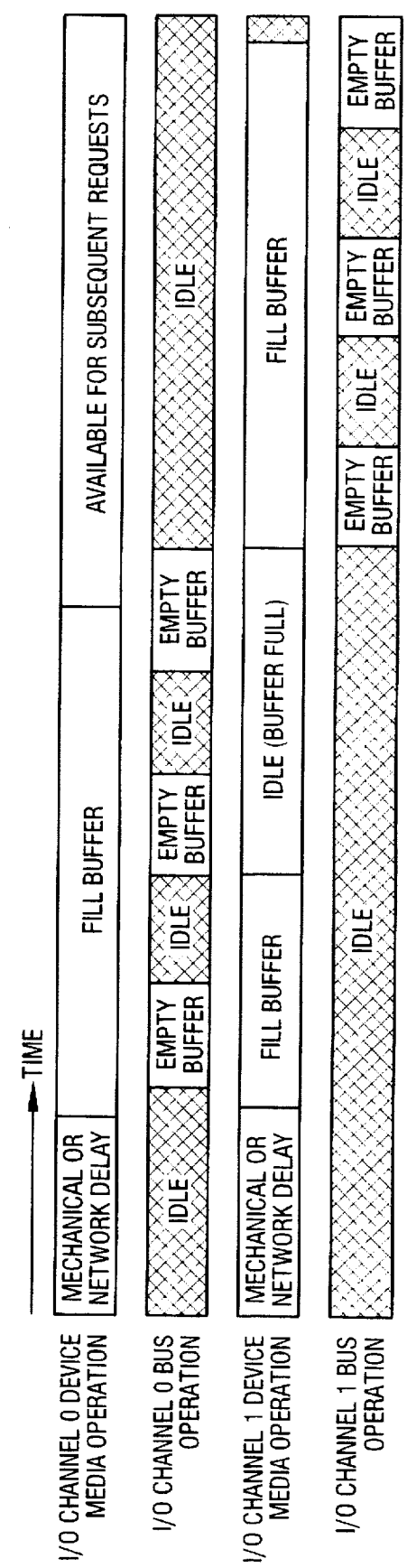
FIG. 3

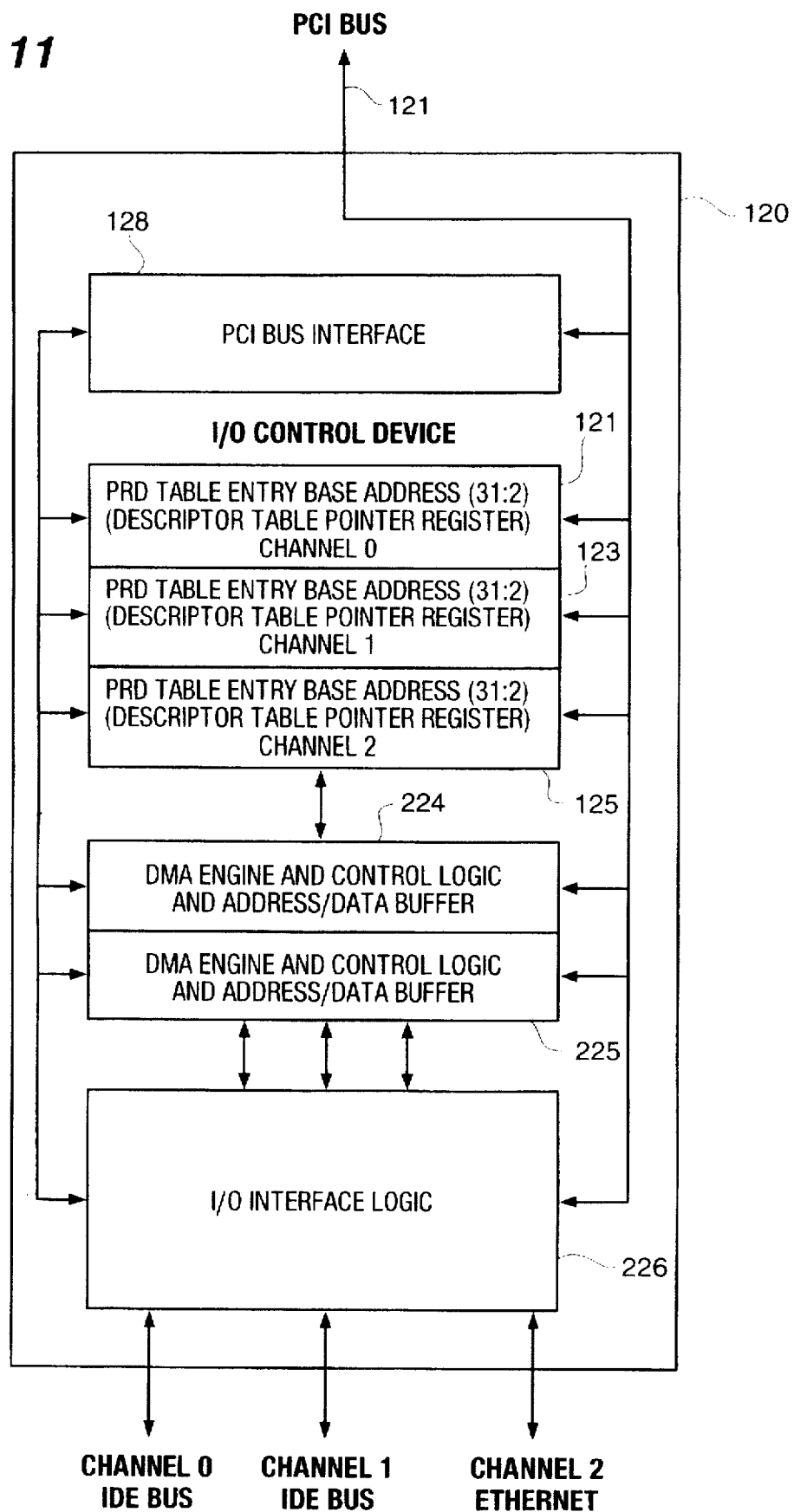

METHOD AND APPARATUS FOR CONTROLLING I/O CHANNELS RESPONSIVE TO AN AVAILABILITY OF A PLURALITY OF I/O DEVICES TO TRANSFER DATA

This is a continuation of application Ser. No. 08/407,439 filed Mar. 17, 1995 now abandoned.

BACKGROUND OF THE INVENTION

1. Field of the Invention

This invention relates to computer system input output (I/O) operations, and more particularly to an apparatus and method for improving I/O performance of a multiple I/O channel computer system at minimal cost. This invention is intended for use in computer systems controlled by a multiple tasking, multiple threaded operating system such as Windows NT, OS/2, System 7.5, Novell or UNIX, but could also provide significant cost advantages in computer systems controlled by single threaded and/or single tasking operating systems such as Windows or DOS.

2. Description of Related Art

A typical computer system generally includes one or more central processing units (CPUs), main memory and one or more I/O channels. The functions of the I/O channels are to transfer data between the CPU's main memory and either storage units or network interface devices. Storage units store data and programs which the CPU uses in performing specific programming tasks. Typical storage units include hard disk drives, CDROMs and tape drives. Network interface devices allow the transfer of data to or from other computer systems on the network. Typical network interfaces include ethernet, fiber channel, ATM and FDDI.

Recently, applications run by the CPU have migrated toward using the high-performance processing power of microprocessors (such as the Intel Pentium, PowerPC and MIPs R4400) to generate real-time, full motion video. To support these applications, substantially more I/O bandwidth is required. Typically, full motion video windows are limited in size to a fraction of the video monitor size due to limitations in I/O bandwidth and or limitations in the processing power of the CPU or video card. Users operating computer systems in multi-window, graphics intensive environments expect instant response to mouse clicks or commands. Mouse clicks on an ICON representing a large text file or application should result in immediate visual results, whether or not the selected file resides on an I/O channel, or whether or not an I/O device is currently transferring large blocks of full motion video data. This instant response expectation, when coupled with the high-bandwidth transfer requirement, dictates that future I/O controllers allow I/O requests to be preempted and rescheduled at a later time.

More recently, new techniques have been proposed for providing low-cost, high-performance I/O in the personal computer (PC) area. Enhanced IDE disk drives having large buffers, capable of interfacing to IDE channels having over sixteen megabyte per second DMA bandwidth, have been demonstrated and produced, and will likely become mainstream in the PC industry over the next few years. Brad Hosler has proposed an IDE interface specification for improving system performance in multitasking environments, called "A Programming Interface for Bus Master IDE Controllers", which assumes the capabilities inherent in the DMA capable IDE disk drives mentioned earlier. Hosler's proposal, which is hereby incorporated by reference as background material, specifies a simple scatter/gather mechanism which allows large or small blocks of I/O transfer data to be scattered to or gathered from main memory. This mechanism cuts down on the number of processor interrupts required and the total number of I/O device interactions with the CPU when transferring large blocks of data, such as that required to support full motion video. Although the scatter gather programming interface specifications were originally intended specifically for controlling hard disk drives on an IDE channel, software drivers can be written to access other types of storage devices on the IDE channel, storage devices on other types of I/O channels or network interface devices using the same homogeneous scatter gather programming interface.

Description of Prior Apparatus

FIG. 1 shows an apparatus used to perform bus master scatter gather DMA operations. The I/O control device 20 contains one or more descriptor table pointer registers 22, a data manages 24, an I/O interface 26 and a CPU interface 28. Each data manager 24 contains (i) a dedicated DMA engine for managing bus master data transfers between the I/O device (not shown) and main memory 30, and (ii) buffer memory required for maintaining maximum data transfer bandwidth between the I/O channel or interface bus 32 and the processor interface 28. The I/O control device 20 (also known as an I/O controller) connects to the CPU 34 and main memory 30 through a bridge 36, via interface 21. The bridge 36 may simply provide an extension of the processor's bus, or may buffer and extend the processor bus using an entirely different bus structure and protocol such as PCI. These types of bridges are commonly known in the art.

Besides containing CPU program and data storage, main memory 30 contains one or more physical region descriptor tables 37 having entries 38. Main memory 30 allows storage of blocks of DMA data 40 transferred to or from the I/O devices on the I/O channel or interface bus 32. Data regions 40 represent blocks of linear DMA transfers of contiguous double words of data, as specified by a respective entry 38 in the physical region descriptor table 37.

Description of Prior Method

FIG. 2 shows a prior method used for performing I/O operations. At step 42, the CPU prepares a physical region descriptor (PRD) table in main memory. Each PRD table entry is 8 bytes long and consists of an address pointer to the starting address and the transfer size of the memory buffer to be transferred. The PRD table may contain up to 8192 PRD table entries, with each entry specifying a single, contiguous block of data to be transferred between the I/O channel device and main memory. Sequential PRD table entries may specify that a block of data be transferred to or from any available location in main memory.

At step 44, the CPU writes the starting address of the main memory physical region descriptor table to the I/O control device's descriptor table pointer register. The CPU writes the I/O controller's DMA transfer direction bit and clears appropriate I/O controller interrupt bits and error flags resulting from previous transfers.

At step 46, the CPU issues the appropriate DMA command to the I/O device.

At step 48, the CPU writes a start scatter gather command to the I/O controller.

At steps 50, 52 and 54, the I/O controller performs a bus master scatter gather DMA operation by sequentially performing all contiguous DMA block transfers between the I/O device and main memory as specified by the complete set of entries within a PRD table.

At step 56, the I/O device signals that the requested data transfer is complete. The I/O controller signals the processor when all of the requested data has traveled through the I/O controller's internal FIFOs and has been written successfully to either main memory or the I/O device.

The I/O controller is usable for the next bus master DMA operation.

Reasons for Needing Improvement to Prior Techniques

The apparatus previously described in FIG. 1 may be extended to allow multiple I/O channel bus master scatter gather operations. Clearly, by adding additional physical region descriptor (PRD) tables, "n" dedicated PRD tables may exist, one for each I/O channel to be managed by the I/O control device, regardless of each I/O channel's protocol and function, so long as the I/O channel and it's associated I/O devices are capable of DMA transfers. Furthermore, from one to "n" data managers may exist, whose function is to transfer data between the I/O devices residing on the "n" I/O channels and main memory. Prior art implementations for performing these data transfers typically dedicate a single data manager to each I/O channel because the methods used to control the data managers are not successful in maintaining maximum possible I/O bandwidth between the I/O devices and main memory. FIG. 3 shows single and dual data manager performance scenarios for a dual channel scatter gather I/O controller using the prior apparatus and methods just described. It should be noted that the I/O channel is idle when the active I/O device's buffer has been emptied by the I/O channel DMA. The I/O channels shown in FIG. 3 perform at a bandwidth of twice the media rate of the I/O device. As FIG. 3 is otherwise self-explanatory to those of ordinary skill in the art, further description need not be given.

Historically, I/O devices, due to the nature of their technology and their mechanical or network delays, are able to sustain data transfers at only 1/16 to 1/2 of the I/O bus bandwidth. Most I/O devices contain buffer memories (32 to 256 K bytes in size) to compensate for their low media or network bandwidths. Thus, once the slow media rate has partially filled the devices buffer memory, I/O bus transfers may progress at data rates dictated by the faster bus bandwidth rather than rates dictated by the slower media or network performance. However, once the buffer space has been exhausted due to a transfer which is larger than the buffer size, transfer bandwidth reverts back to the media or network bandwidth. It should also be noted in FIG. 3 that the prior method of performing DMAs does not efficiently utilize I/O device buffer memory during scatter gather operations. In fact, substantial media idle time and I/O bus idle time is incurred when using prior art methods with a single data manager and two I/O channels. The single data manager mechanism compromises the aggregate I/O performance by requiring the completion of an I/O channel's PRD table prior to starting a bus master operation on the alternate channel. Dual data manager I/O controllers overcome these problems, but are expensive to implement due to their large FIFOs and complex DMA engines.

In spite of numerous recent I/O related developments and proposals in the PC industry, additional capabilities are needed for achieving maximum I/O performance in multi-tasking, multi-threaded operating systems, at reasonable cost. The present invention provides an apparatus and method for further improving computer systems I/O performance at minimal cost.

It is therefore an object of the present invention to provide an improved data processing system.

It is another object of the present invention to provide an improved I/O operation in a data processing system.

It is yet another object to the present invention to provide improved DMA operations in a data processing system.

It is still another object of the present invention to provide improved DMA performance, at minimal incremental cost, in a data processing system.

SUMMARY OF THE INVENTION

The present invention provides an apparatus and method for improving the input/output performance of a computer system under the control of a multi-tasking, multi-threaded operating system. In particular, the invention provides an apparatus and method to chain contiguous DMA scatter gather sub blocks of a PRD table for channel 0 with contiguous DMA scatter gather sub blocks of a PRD table for channel 1, using a single data manager, while maintaining maximum media bandwidth. DMA block transfers are scheduled based on the availability of data from the I/O device's buffer memory, thus minimizing both media or network idle time as well as minimizing I/O bus idle time. Near maximum aggregate bandwidth of multiple I/O buses and their associated devices is obtained. The apparatus and method thus provides significant performance advantages over prior techniques having two I/O channel systems implemented with a single data manager.

The apparatus and method provides a means for preempting outstanding and inprogress DMA requests to an I/O device on a given I/O channel when a higher priority request is encountered for a device on the same channel or for the same device.

In a homogeneous programming interface environment as described previously, the invention can be easily extended to control "n+i" I/O channels using "n" data managers.

The apparatus provides a performance efficient method for software drivers to make use of preemptive scheduling techniques found in newer multi-tasking, multi-threaded operating systems. Preemptive support lessens the response time of performance critical I/O requests.

The details of the preferred embodiment of the present invention are set forth in the accompanying drawings and in the description which follows.

BRIEF DESCRIPTION OF THE DRAWINGS

FIG. 3 contains performance analysis diagrams for single and dual data manager, dual I/O channel operations.

FIG. 11 is a block diagram of an alternate operating environment of this invention, using a PCI/Dual IDE/ ethernet I/O channel control device.

DETAILED DESCRIPTION OF THE PREFERRED EMBODIMENT

Description of Preferred Apparatus

Figure 1:
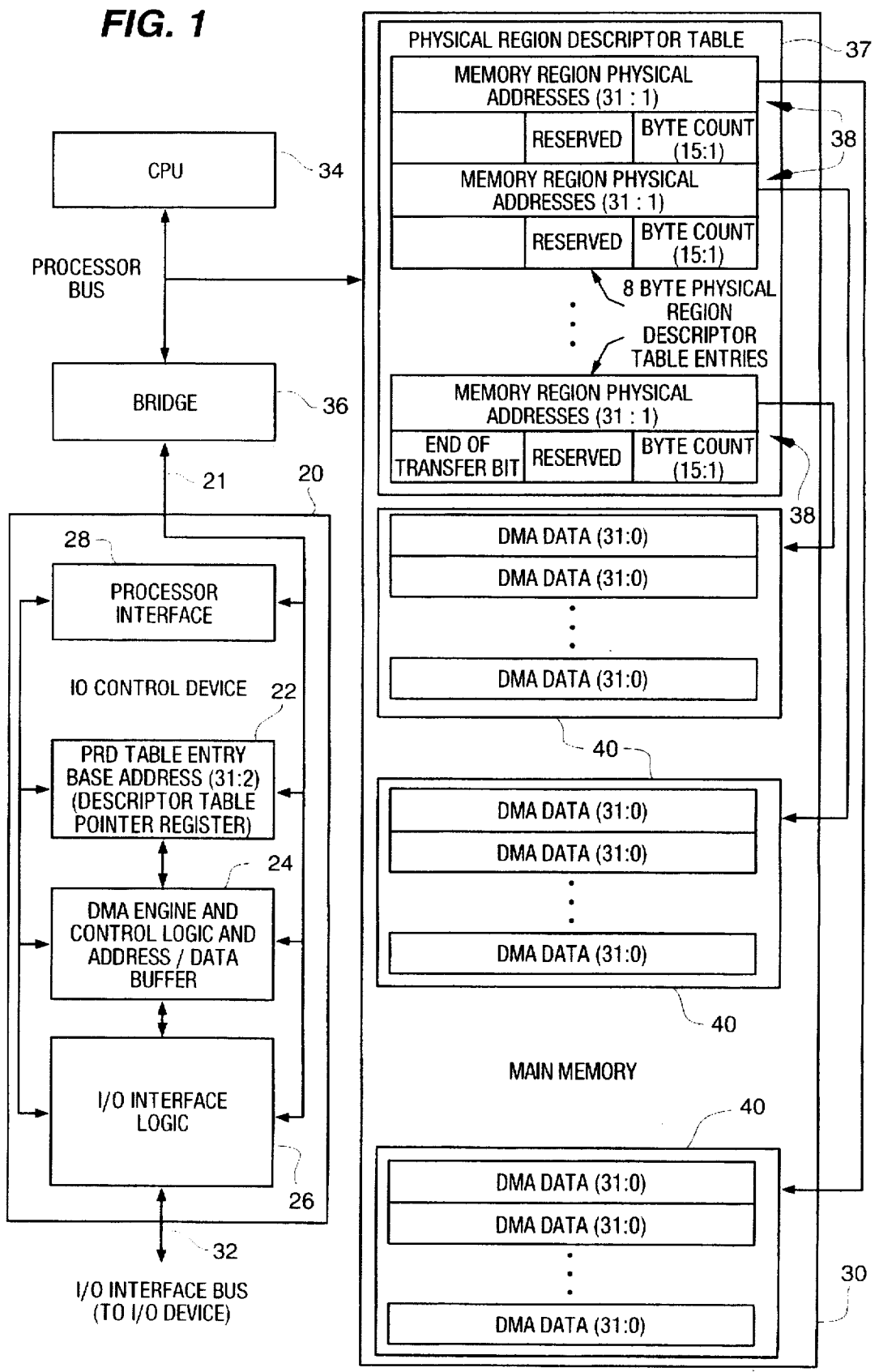
FIG. 1 is a diagram of a prior mechanism for performing bus master scatter gather DMA operations.
Figure 2:
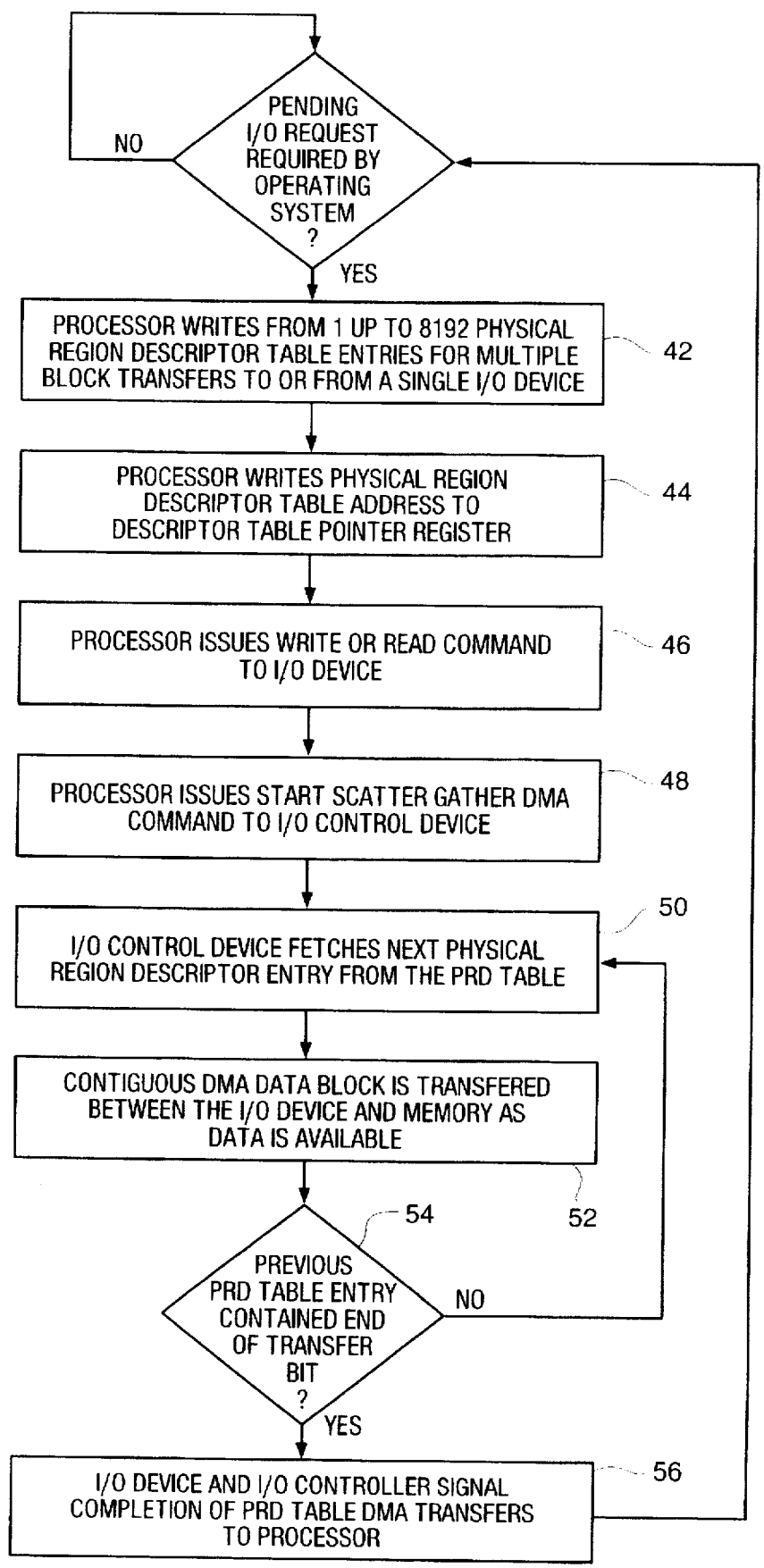
FIG. 2 is a diagram of a prior method or flow chart for performing bus master scatter gather DMA operations.
Figure 4:
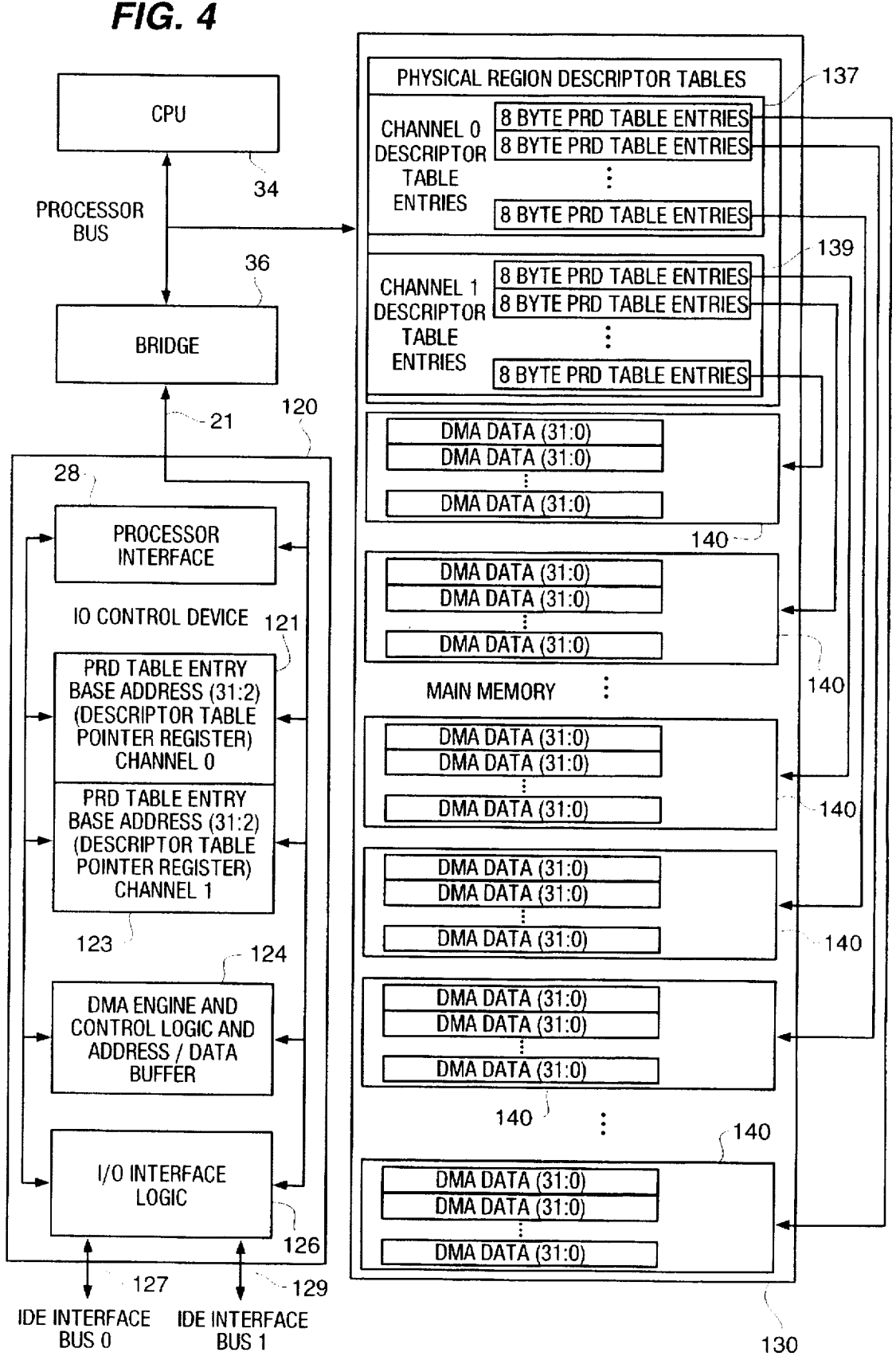
FIG. 4 is a diagram of the mechanism for performing single data manager controlled bus master scatter gather DMA operations in a two I/O channel system.

FIG. 4 shows the preferred apparatus. The I/O control device 120 contains a single data manager 124 and I/O interface logic 126 which interfaces to two IDE I/O channels 127 and 129. Main memory 130 contains two physical region descriptor tables 137 and 139 for controlling bus master DMA transfers on bus/channel 0 and bus/channel 1. A single PRD table is dedicated to each I/O channel, as shown at 121 and 123. The data manager 124 contains the necessary logic to chain DMA scatter gather blocks specified by PRD table entries between channels and between PRD tables in an alternating fashion. The data manager also contains the necessary logic to determine whether or not a target device on either channel contains DMA data ready for transfer. PRD tables 137 and 139 are not "swapped" by the data manager unless the alternate channel is prepared to transfer data.

Description of Preferred Method

Figure 5A:
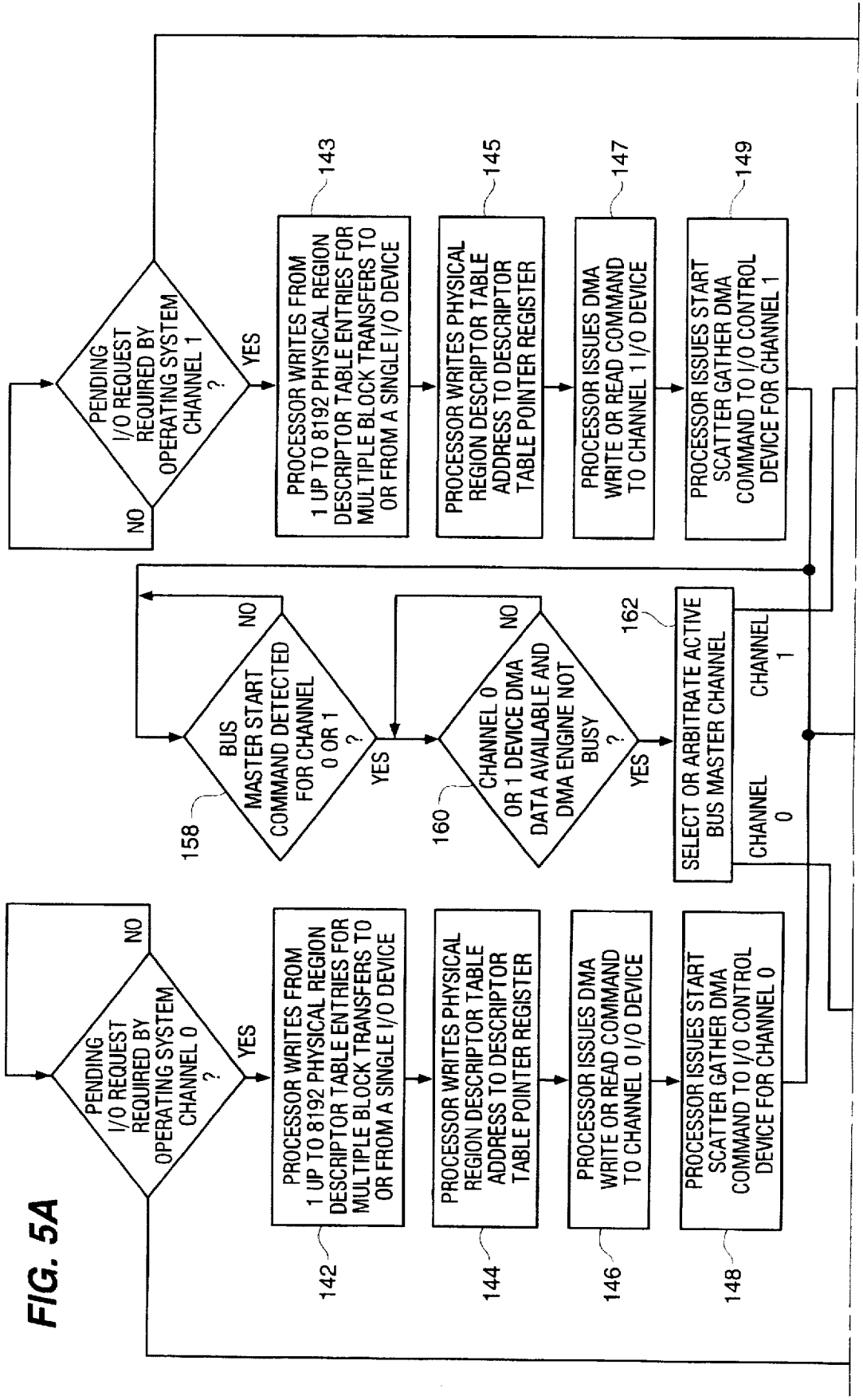
FIG. 5 is a diagram of the method for performing single data manager controlled bus master scatter gather DMA operations in a two I/O channel system.
Figure 5B:
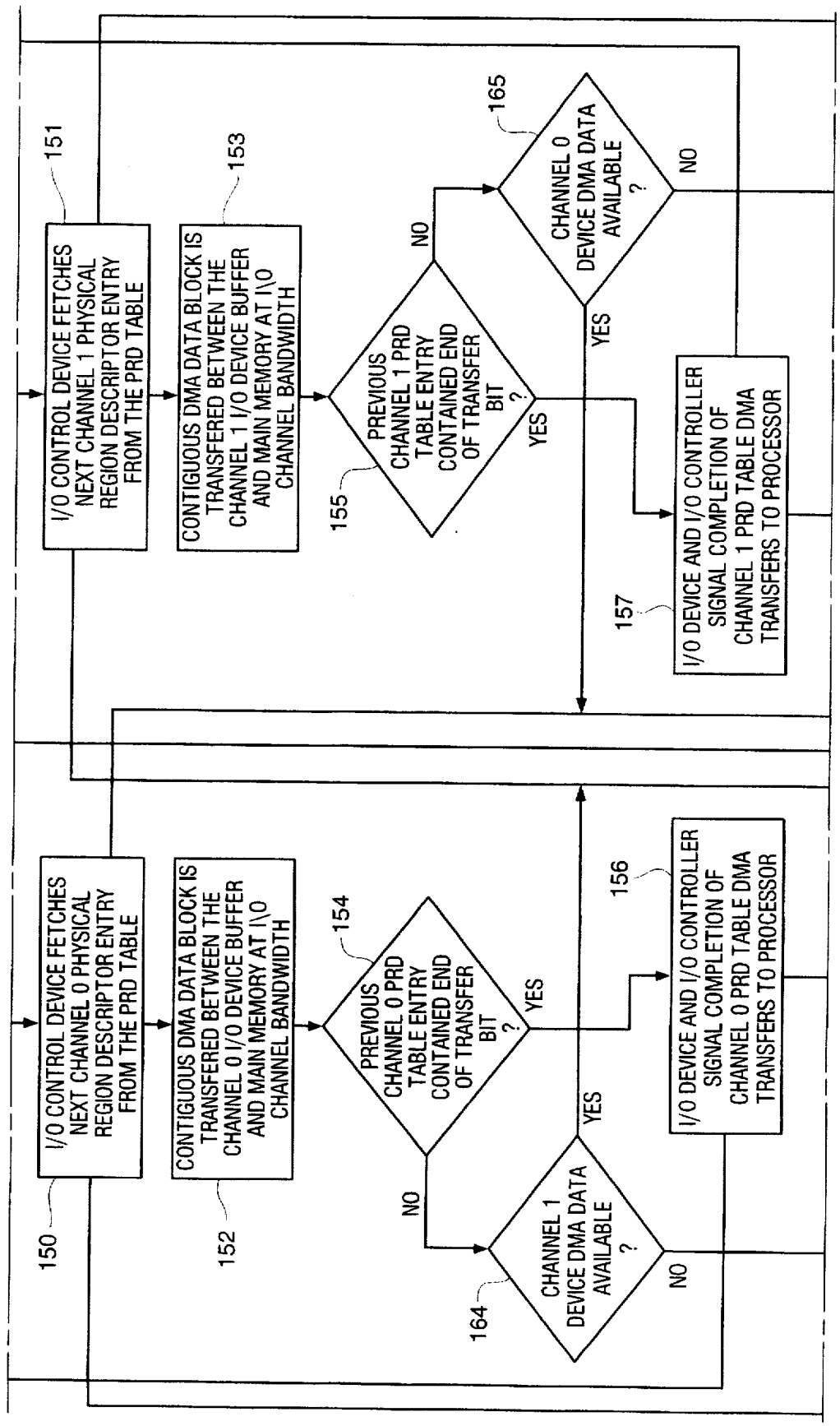
Figure 5C:
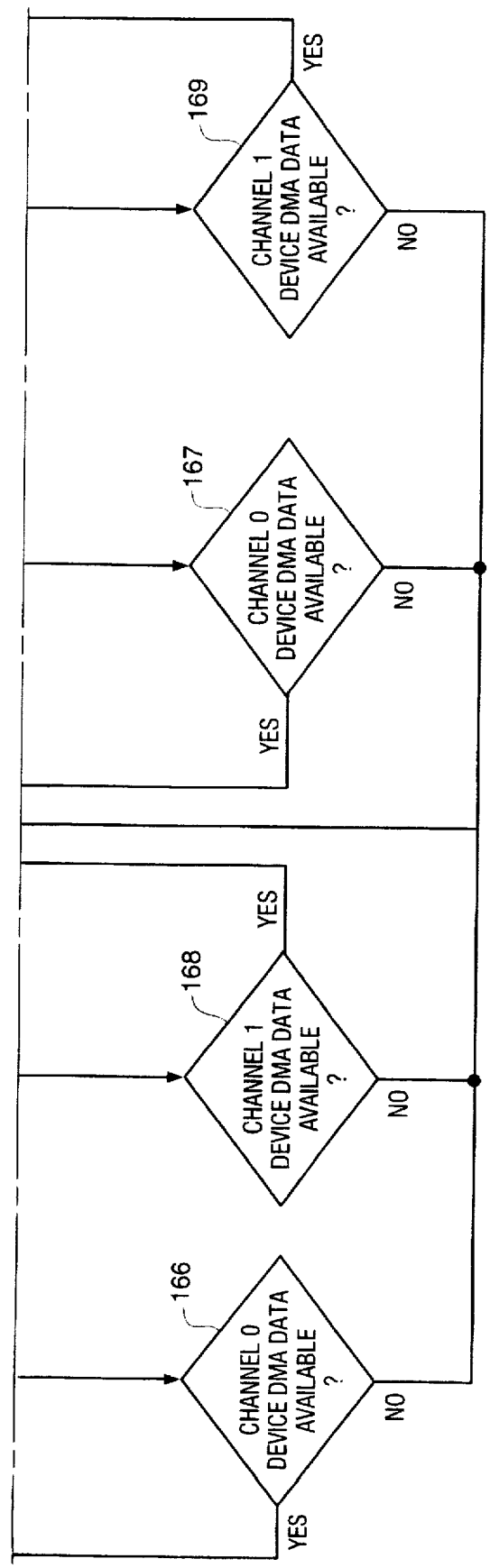

FIG. 5 shows the preferred method used for performing I/O operations. At steps 142 and 143, the CPU prepares a physical region descriptor (PRD) table in main memory. Each PRD table entry is 8 bytes long and consists of an address pointer to the starting address and the transfer count of the memory buffer to be transferred. The PRD table may contain up to 8192 PRD table entries, with each entry specifying a single, contiguous block of data to be transferred between the I/O channel device and main memory. Sequential PRD table entries may specify that a block of data be transferred to or from any available location in memory. The two PRD tables may be prepared concurrently or sequentially.

At steps 144 and 145, the CPU writes the starting address of the main memory physical region descriptor table to the I/O control device's descriptor table pointer register. The CPU writes the I/O controller's DMA transfer direction bit and clears appropriate I/O controller interrupt bits and error flags resulting from previous transfers. The CPU may write either descriptor table pointer register at any time so long as the table to be written is not an active bus master.

At step 146 or 147 (depending upon which channel is being used), the CPU issues the appropriate DMA command to an I/O device. A second I/O device on the alternate channel may be issued an additional DMA command concurrently with the previously mentioned I/O device's DMA operation.

At step 148 or 149 (depending upon which channel is being used), the CPU writes a start scatter gather command to one channel of the I/O controller. A second I/O control devices may be issued the start scatter gather command concurrently with the alternate channel's bus master operation.

As shown in the remaining steps of FIG. 5, the I/O controller performs a bus master DMA operation on the first contiguous DMA block transfer available from either active I/O device, as specified by the associated PRD table entry for that channel. Following the above contiguous DMA block transfer, the data manager transfers a block from the alternate channel if data is available from the I/O device on that channel. If data is not available from the alternate channel, and data is available from the original channel, the data manager transfers a block from the original channel. Transfers continue in this manner so long as data is available on one of the two channels, and the current PRD tables have not been exhausted. If neither channel has data available for transfer, the data manager waits for the first available data transfer opportunity. Once data is available from either channel, the alternating channel DMA flow described above is restarted.

At steps 156 or 157 (depending upon which channel is being used), the I/O device determines the transfer status, then signals that the requested data transfer is complete. The I/O controller signals the processor when all of the requested data has traveled through the I/O controller's internal FIFOs and has been written successfully to either main memory or the I/O device. An I/O device on the alternate channel will continue operation following completion of a PRD table by the original channel.

Description of Preemption Mechanism

The preferred method provides the capability to non-destructively preempt either bus master at any time during the transfer process. Two types of preemption exist, a preemption during mechanical or network delays prior to data transfer across the I/O bus, and preemption during active DMA data transfers. The first preemption (i.e. prior to data transfer) is detected at the 'Yes' exit point from block 158 of FIG. 5. The second preemption (i.e. during active DMA data transfers) is detected at the 'Yes' exit point from blocks 154 and 155 of FIG. 5.

During preemption, the process/program clears the start scatter gather command from the I/O control device for the preempted channel and evaluates the appropriate descriptor table pointer.

If the pointer contains the address of the last PRD table entry from a previously executed PRD table, then the preemption is of the "prior to DMA" type. The process/ program clears the active I/O device command, sends a new DMA command to the desired I/O device, rewrites the PRD tables, saves the current descriptor pointer register, rewrites the descriptor pointer register, and sends a new start scatter gather command to the I/O control device. When the preempting PRD table has completed it's transfer, the previously saved descriptor pointer register is reloaded following the reissuing of the DMA command to the preempted I/O device.

If the pointer contains the address of any PRD table entry from the current PRD table, then the preemption is of the "during DMA" type. The process/program writes a "stop after current table entry" command to the I/O control device. The data manager will complete the current PRD table entry's DMA, then interrupt the processor.

The process/program clears the active I/O device command, sends a new DMA command to the desired I/O device, rewrites the PRD tables, saves the current descriptor pointer register, rewrites the descriptor pointer register, and sends a new start scatter gather command to the I/O control device. When the preempting PRD table has completed its transfer, the previously saved descriptor pointer register is reloaded following the reissuing of the abbreviated DMA command to the preempted I/O device.

Merging of Concurrent Interrupts

As previously described, multiple contiguous DMA blocks, controlled by PRD table entries in a scatter gather PRD table, are transferred to or from contiguous memory space of a specific I/O device. Following the final data transfer controlled by the last entry in a PRD table, the processor is interrupted either by the I/O device or the I/O controller depending on the I/O controller's current configuration. "n" concurrent data transfer operations for multiple I/O devices on multiple I/O channels complete their transfers based on time scales that are not deterministic in nature. This characteristic of concurrent I/O channel operation requires a mechanism to associate a given interrupt with the responsible I/O device, channel and operation. Furthermore, concurrent I/O operations could generate multiple, overlapping interrupts requiring either a hardware interrupt queuing logic, or complex interrupt handling software for the host processor.

Figure 6A:
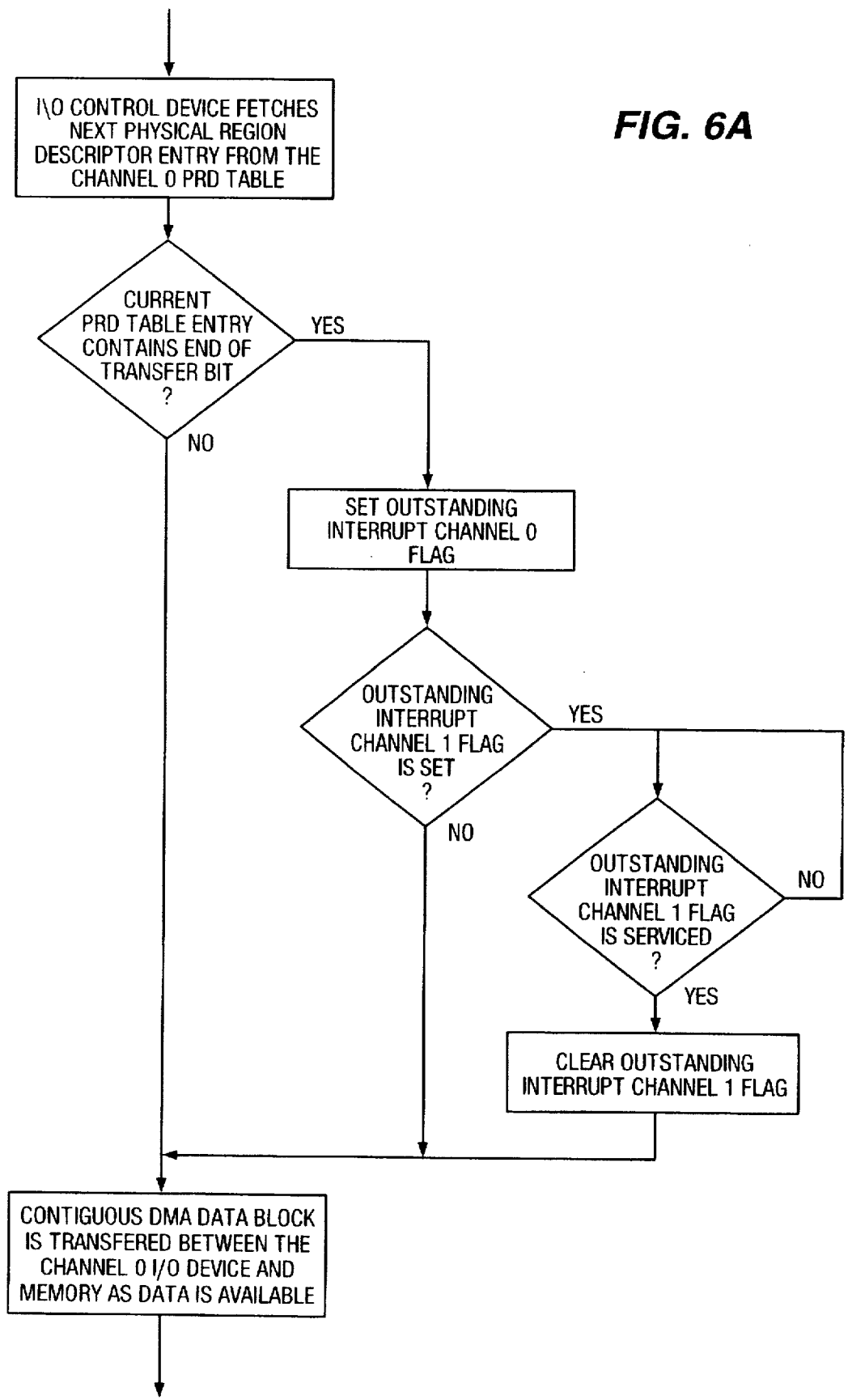
FIG. 6 shows a method for merging concurrent interrupts.
Figure 6B:
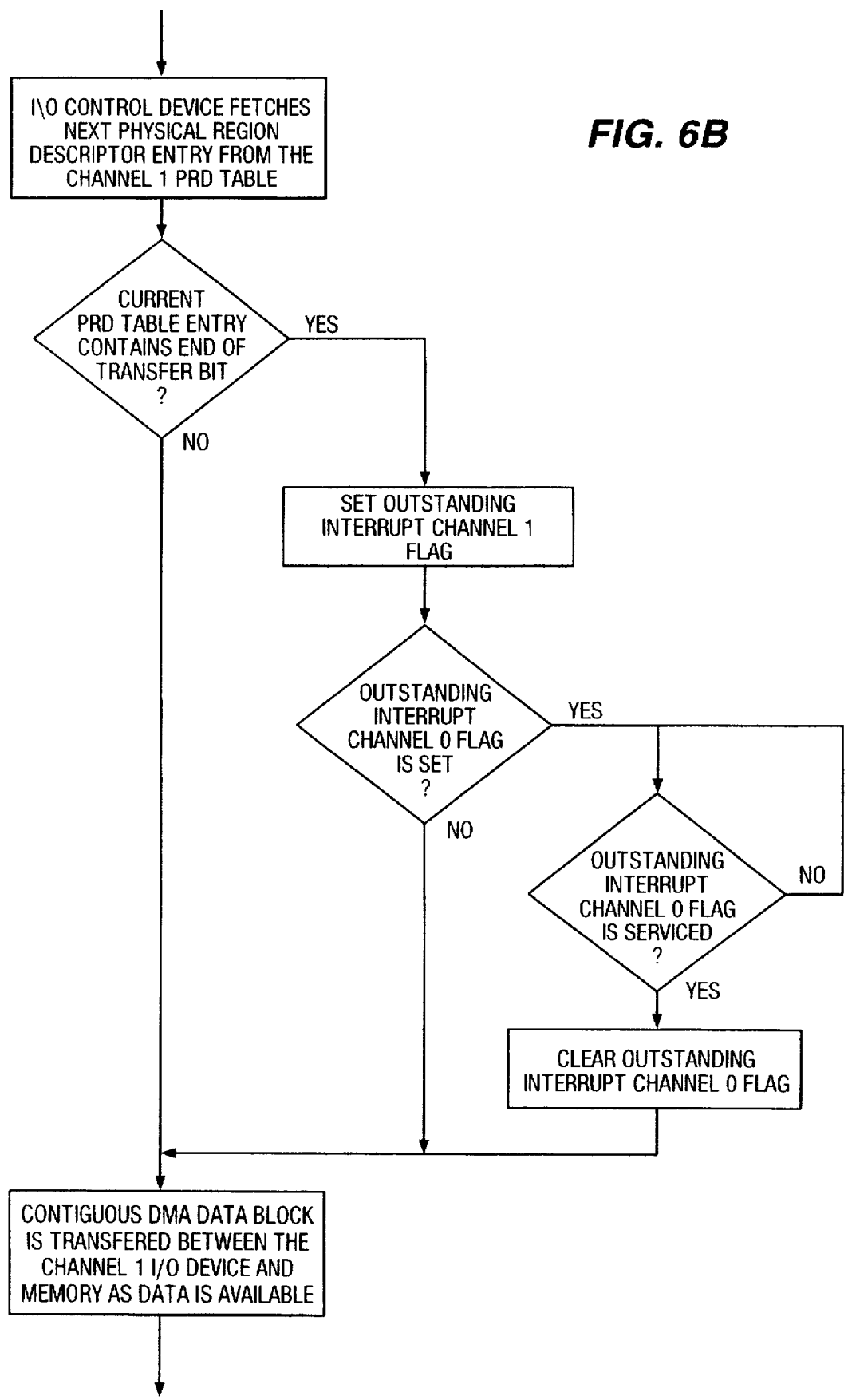
Figure 6C:
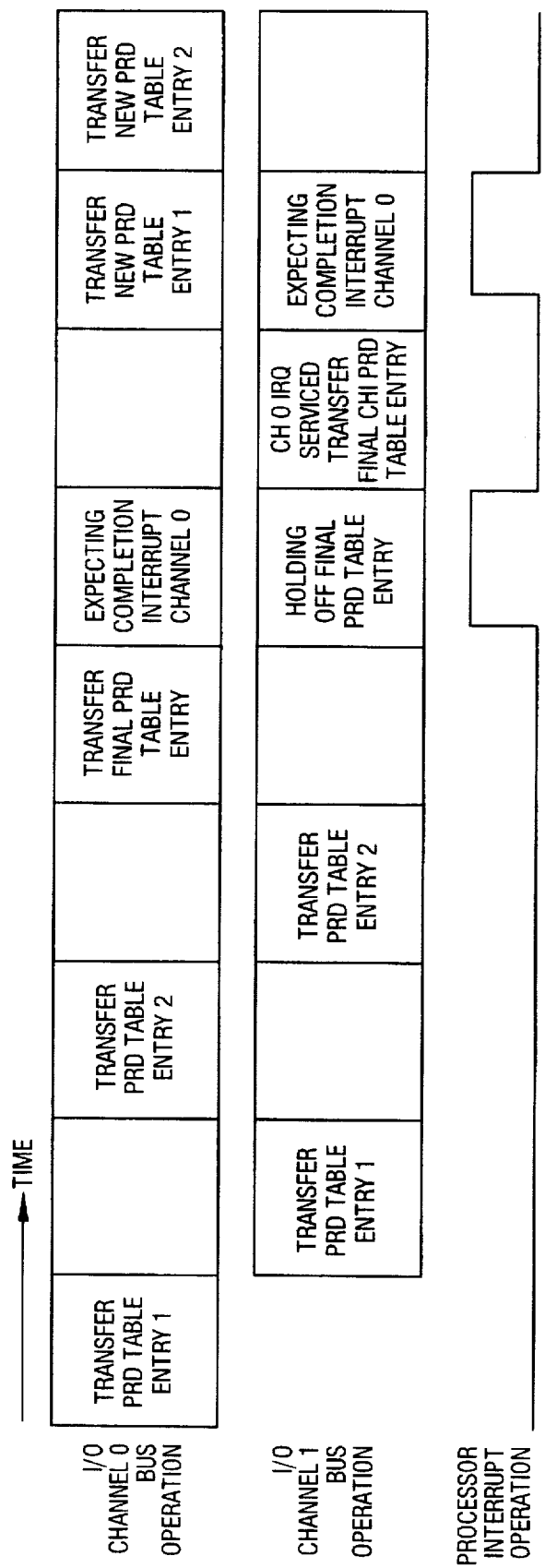

As shown in FIG. 6, the current invention controls interrupt generation through selective arbitration. When a scatter gather transfer reaches it's final PRD table entry, a processor interrupt is eminent, and will occur following the successful completion of data transfer controlled by that table entry. Other channels' concurrent scatter gather DMA transfers are allowed to proceed through their PRD table so long as they are not executing a final block transfer PRD entry themselves. If a second final PRD table entry transfer is encountered, its operation is deferred until the first channel's transfer completion interrupt has been serviced by the host processor. If more than two active I/O channels exist, and both previous channels have reached last table entry status, the third I/O channel will proceed with scatter gather DMA operations so long as that channel doesn't encounter an eminent end of table condition prior to the CPU servicing anticipated or outstanding previous data transfer completion interrupts.

Thus, the described techniques provide discrete, non-overlapping interrupts to signal the completion of each I/O block transfer request to the host processor. This capability minimizes the complexity and improves the performance of the host processor's interrupt handling software, when managing concurrent I/O transfers. Prior methods for handling concurrent interrupts required interrupt queues or complex interrupt handling software running on the host CPU.

Data Manager Arbitration and Selection

Figure 7:
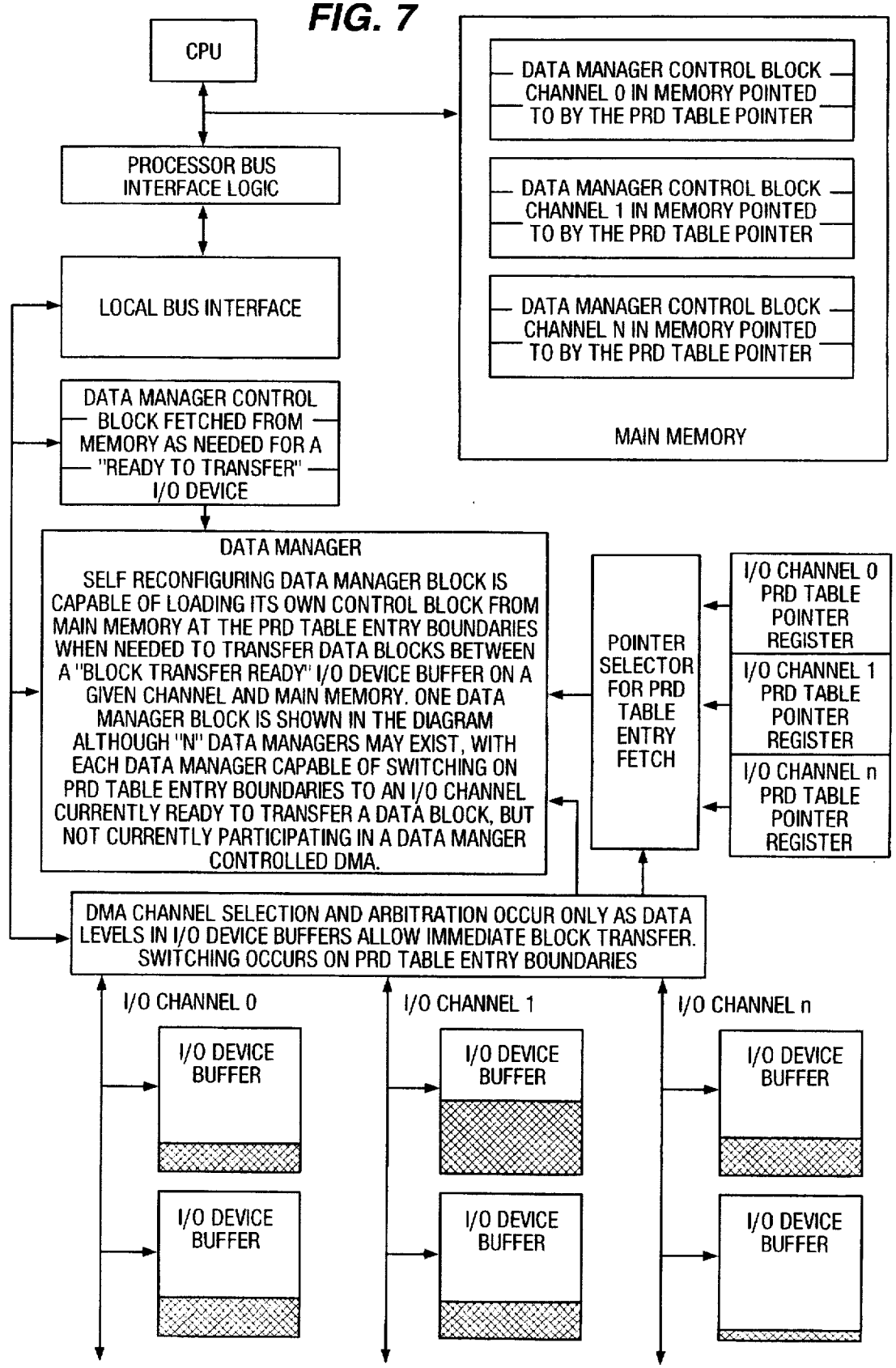
FIG. 7 shows a method for arbitration and selection by a data manager.

First order data manager selection and arbitration is based on the capability of a given I/O device to transfer data at any given point in time. Typical I/O devices contain internal buffers which allow data to be transferred to or from the I/O device at maximum I/O channel bandwidth rather than at the slower media or network bandwidths. FIG. 7 shows how data transfer is selected/enabled. During I/O read operations, the I/O device requests data transfers to the I/O channel when internal memory buffers have been filled to a preconfigured "high watermark" level, insuring that the resulting DMA to the I/O channel efficiently utilizes the available I/O bus bandwidth. During I/O write operations, the I/O device requests data transfers from the I/O channel when internal memory buffers are at a "low watermark" level, once again allowing efficient utilization of the I/O bus bandwidth. First order data manager channel selection is based directly on an I/O device's ability to transfer a block of data at any given point in time. This method is efficient due to the selection process being controlled by actual data availability from the I/O device during I/O reads, or buffer availability within the targeted I/O device during I/O writes. This method is much more cost efficient to implement because the anticipatory logic, bus monitoring logic and complex arbitration logic or software or alternative approaches is not required.

Thus, in summary, first order DMA scheduling is on an as needed basis depending upon whether or not the targeted I/O devices have transferred enough data from (or to) media or the network to partially fill (or empty) the I/O device buffer. The apparatus allows various second order arbitration and scheduling techniques to be used for scheduling bus master DMA operations among "n" data managers for "n+i" I/O channels when multiple I/O channels meet the first order constraints for bus mastership, while seeking the use of a data manager which has recently become idle. Well known arbitration algorithms such as round robin, first come first serve, least recently used, most recently used and random can be used for second order arbitration.

Performance Improvements

Figure 8:
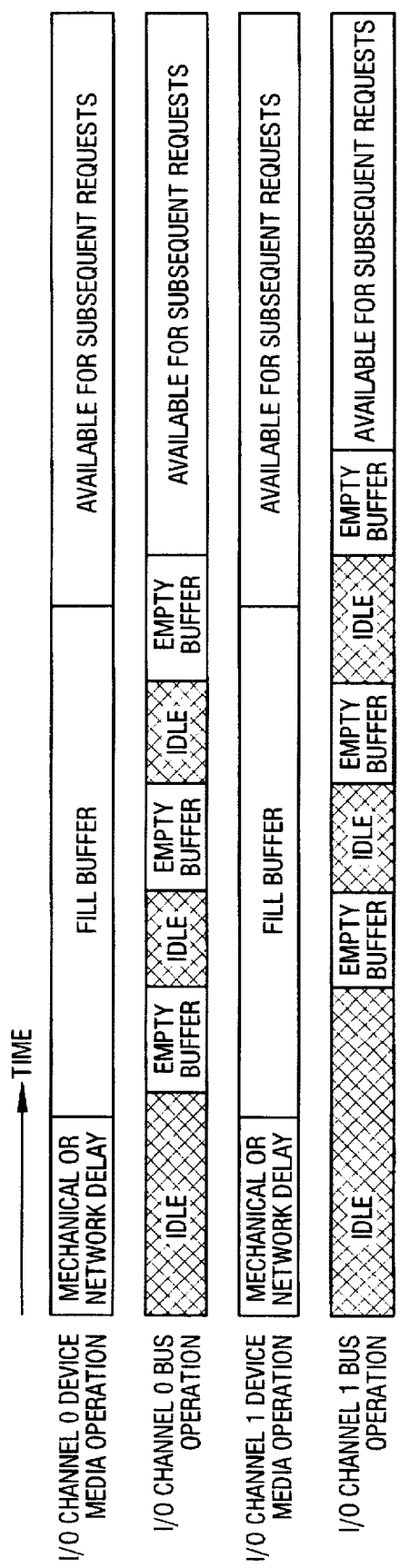
FIG. 8 contains performance analysis diagrams for present invention single data manager, dual I/O channel operations.

FIG. 8 shows that the preferred method described hereinabove efficiently utilizes the buffering capabilities of the I/O devices as well as the bandwidth of the two I/O channels. It should be noted that, similar to the assumptions given with respect to FIG. 3, the I/O channel is idle when the active I/O device's buffer has been emptied by the I/O channel DMA. The I/O channels shown in FIG. 6 perform at a bandwidth of twice the media rate of the I/O device.

A comparison with FIG. 3 shows that the single data manager solution described here performs almost as well as the previously described dual data manager solution, and significantly out performs the previously described single data manager, dual I/O solution. Furthermore, the process/program can tune the I/O transfer performance by modifying the transfer size and number of the PRD table entries based on the I/O devices' buffer size, media rate and priority.

Operating Modes

Figure 9:
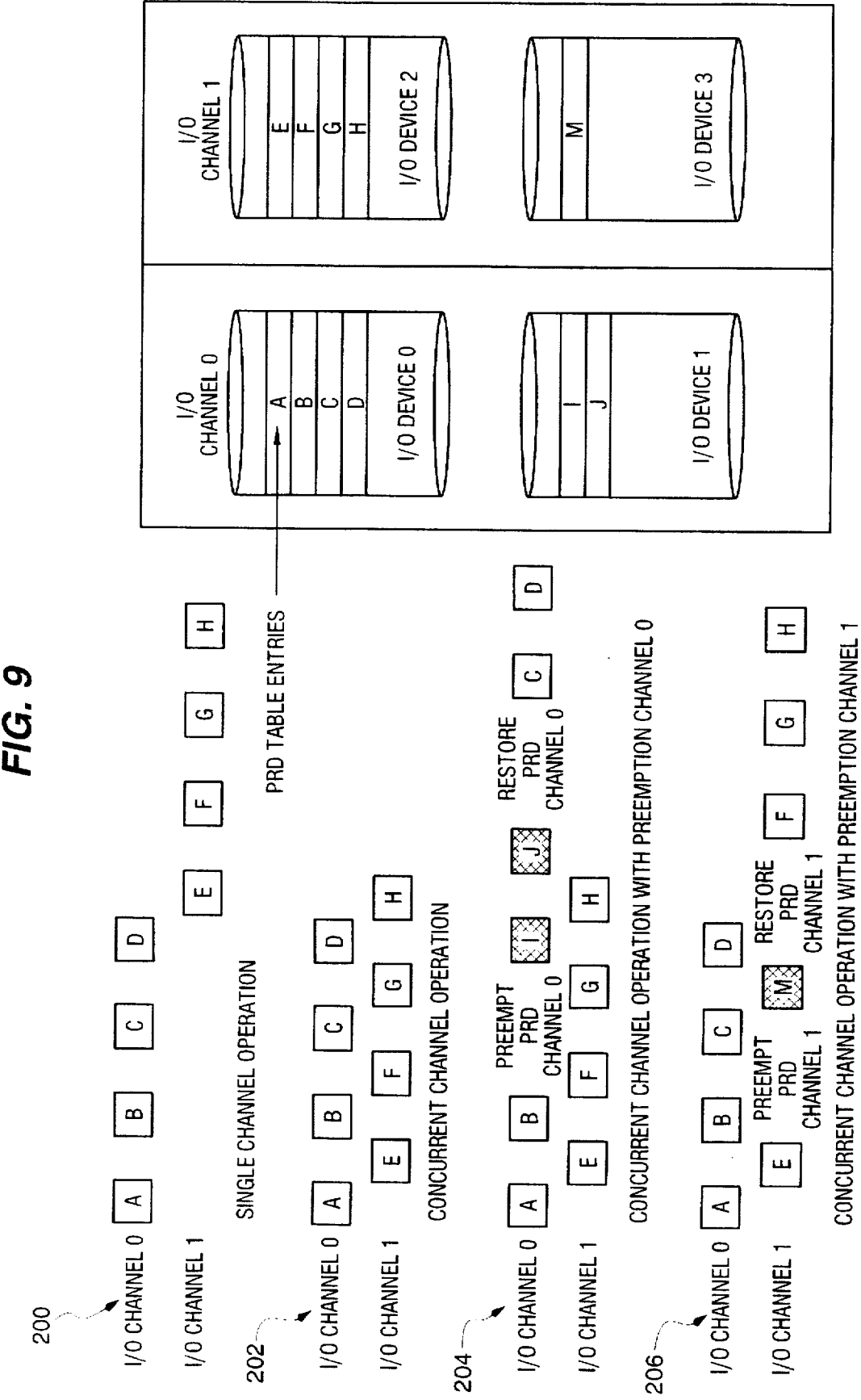
FIG. 9 contains diagrams showing possible modes of operation supported by the current invention.

Typical operation modes allowed by the present invention are shown in FIG. 9. A single channel operation is shown at 200, where Channel 0 transfers blocks A, B, C and D, followed by Channel 1 transfer of Blocks E, F, G and H.

Concurrent channel operation is shown at 202, where the transfer of blocks A, B, C and D from Channel 0 are interleaved with the transfer of blocks E, F, G and H from Channel 1. Although individual blocks are not transferred concurrently, but rather interleaved, the overall data transfer can be viewed as being concurrent.

Concurrent channel operation with Channel 0 preemption is shown at 204, where data from another device on a particular channel (in this example blocks I and J from a device 1 on Channel 0) preempts the transfer of data from a device on the same channel (in this example, blocks A, B, C and D from device 0 on Channel 0). The blocks are initially transferred similar to that shown with the normal concurrent channel operation of 202. However, prior to transferring Block C, a preemption on channel 0 is received. The process previously described is then performed, including rewriting the descriptor pointer register. Channel 1 then continues DMA transfer of its next block of data (block G). Channel 0 then transfers a block of data (block I) from the preemptive second device on Channel 0. Channel 1 then continues DMA transfer of its next block of data (block H). Channel 0 then transfers the next block of data (block J) from the preemptive second device on Channel 0. As this second device has no more data to transfer, the original PRD for channel 0 is restored, and data transfer from the first device on channel 0 continues with the transfer of blocks C and D.

Concurrent channel operation with Channel 1 preemption is shown at 206. This operates in an analogous fashion to that just described with respect to the preemptive Channel 0 operation of 204. Hence, further discussion is not needed.

System Environments

Figure 10:
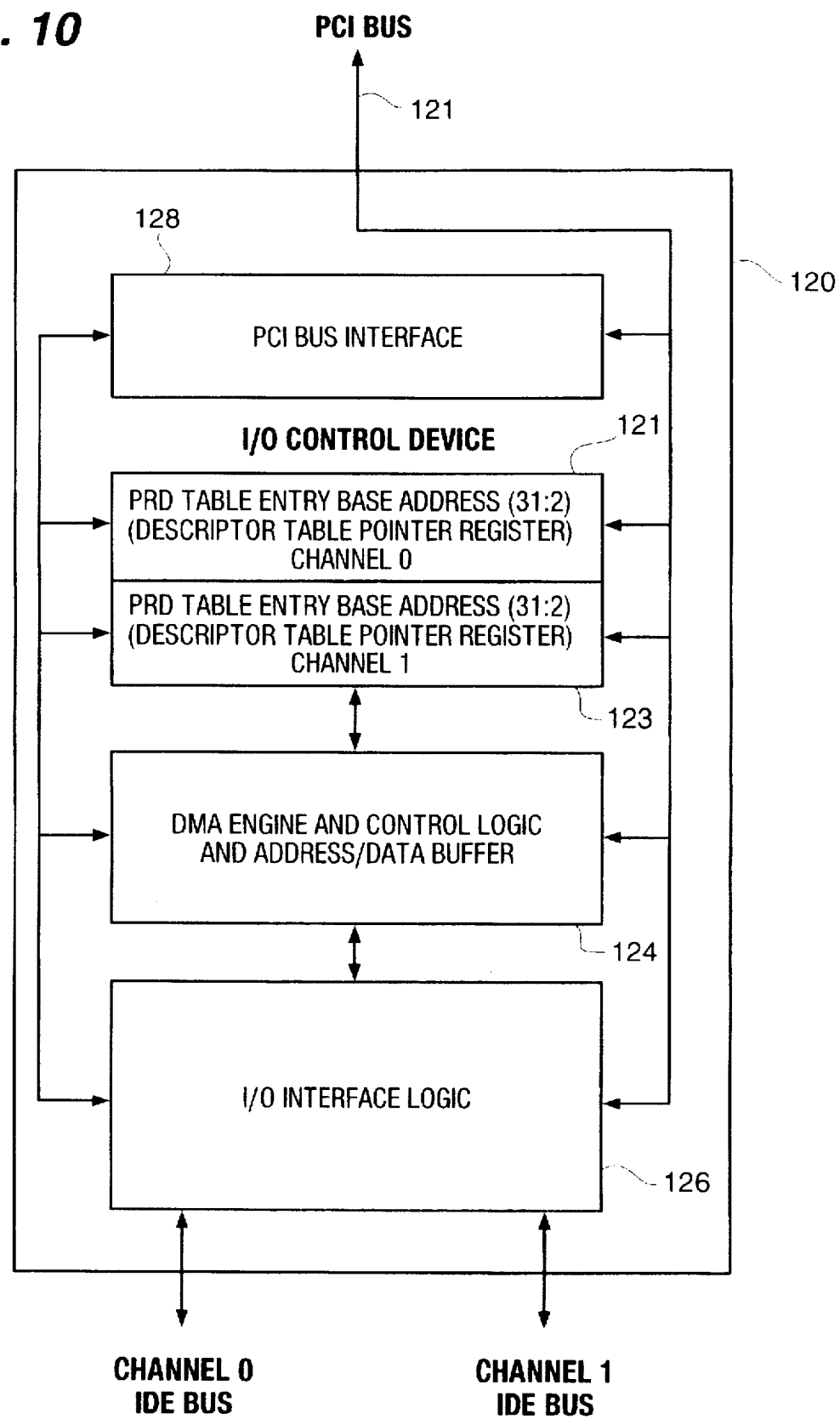
FIG. 10 is a block diagram of the preferred operating environment of this invention, using a PCI/Dual IDE I/O channel control device.

FIG. 10 shows the I/O Control Device 120 used in the preferred system environment. As shown, the preferred environment is for use in interfacing two channels of an IDE bus with a PCI bus. IDE buses and PCI buses are well known in the art. The I/O control device 120 allows for a more efficient DMA transfer in such an environment, as previously described.

FIG. 11 shows an alternate system environment to that of FIG. 10. The techniques described herein can be extended to support two channels of an IDE bus in addition to an ethernet channel. In order to achieve such expansion, an additional descriptor pointer register 125 for channel 2 is added. An additional DMA engine 225 is also added to provide specific DMA interface support for the additional channel. This DMA engine would operate in similar fashion to that shown in FIG. 5, but only having flow control for managing a single channel (as opposed to the two channels shown in FIG. 5).

The above described apparatus and method provides a mechanism for performance tuning DMA transfers between main memory and I/O devices, based on the media or network bandwidth and buffer size of the I/O device. Slower I/O devices (i.e. CDROMS, tape drives or ethernet network devices) are controlled using a larger number of scatter gather PRD table entries having a smaller block transfer size. Faster I/O devices (i.e., hard disk drives or fiber channel switch fabric ports) are controlled using a smaller number of scatter gather PRD table entries having a larger block transfer size. Likewise, I/O devices having smaller buffer sizes are controlled using a larger number of scatter gather PRD table entries having a smaller block transfer size. I/O devices having larger buffer sizes may be controlled using a smaller number of scatter gather PRD table entries having a larger block transfer size. Software may easily tune the I/O controller to provide balanced, high aggregate bandwidth system performance.

While we have illustrated and described the preferred embodiments of our invention, it is to be understood that we do not limit ourselves to the precise constructions herein disclosed, and the right is reserved to all changes and modifications coming within the scope of the invention as defined in the appended claims.

We claim:

1. A method for transferring blocks of data with a plurality of input/output (I/O) devices in a data processing system, comprising the step of:

interleaving DMA block transfers responsive to data transfer availability of at least two of the plurality of I/O devices.

2. The method of claim 1 wherein the interleaving DMA block transfers step uses a single data manager.

3. The method of claim 1 wherein the interleaving DMA block transfers step is based on actual data availability from the I/O devices during a read.

4. The method of claim 1 wherein the interleaving DMA block transfers step is based on buffer availability within the I/O devices during writes.

5. The method of claim 1 wherein the interleaving DMA block transfers step is used to interface two channels of a first bus with a channel of a second bus.

6. The method of claim 1 wherein slow I/O devices are controlled responsive to a large number of table entries, each table entry having a small block transfer size.

7. The method of claim 1 wherein faster I/O devices are controlled responsive to a small number of table entries, each table entry having a large block transfer size.

* * * * *